Oct. 17, 1933.　　　C. L. GOUGHNOUR　　　1,931,190
ELECTRIC HEATING ELEMENT FOR STEAM COOKERS
Filed Feb. 3, 1930　　　3 Sheets-Sheet 1

Inventor
Charles L. Goughnour
By
Bryant O Lowry
Attorneys

Oct. 17, 1933.  C. L. GOUGHNOUR  1,931,190
ELECTRIC HEATING ELEMENT FOR STEAM COOKERS
Filed Feb. 3, 1930   3 Sheets-Sheet 2
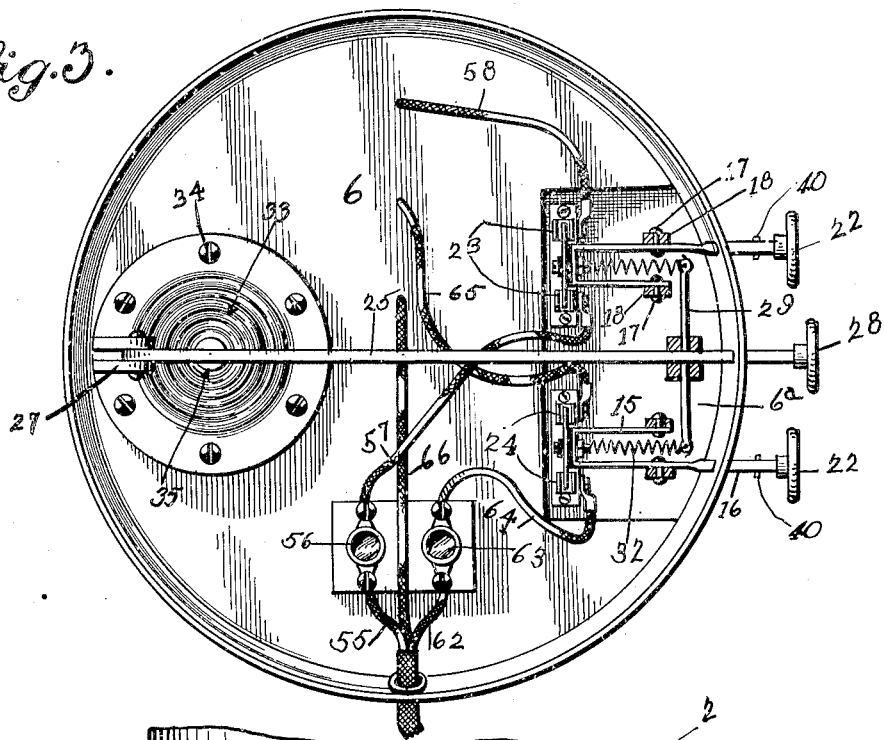
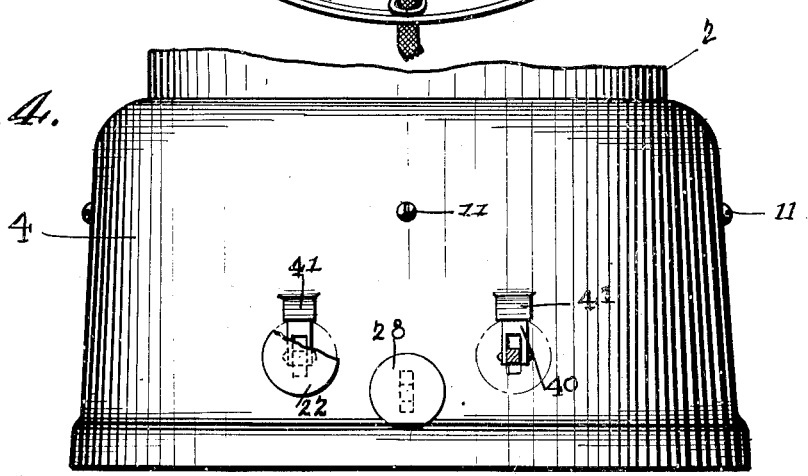
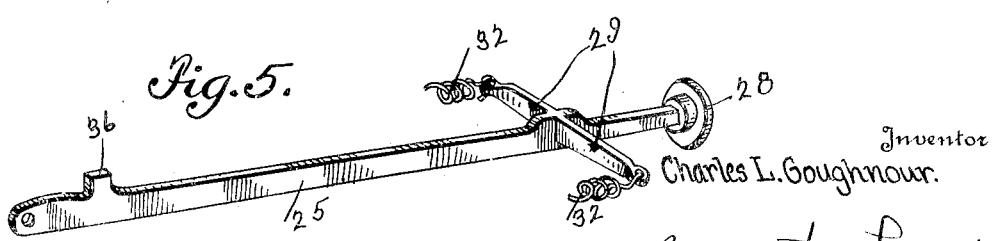
Inventor
Charles L. Goughnour.
By Bryant & Lowry
Attorneys Oct. 17, 1933.  C. L. GOUGHNOUR  1,931,190
ELECTRIC HEATING ELEMENT FOR STEAM COOKERS
Filed Feb. 3, 1930  3 Sheets-Sheet 3
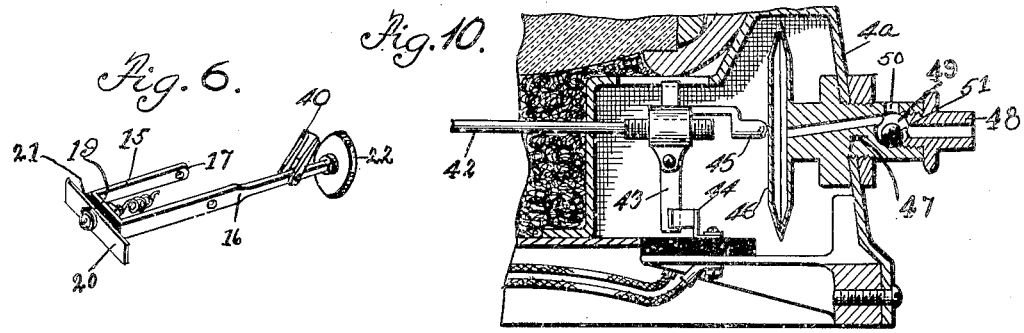
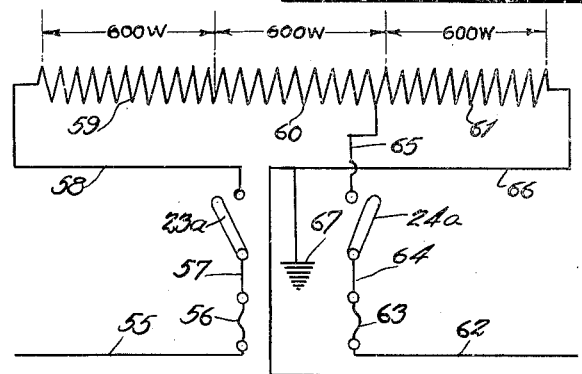
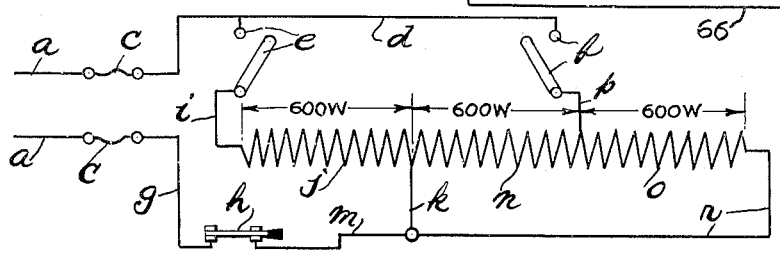
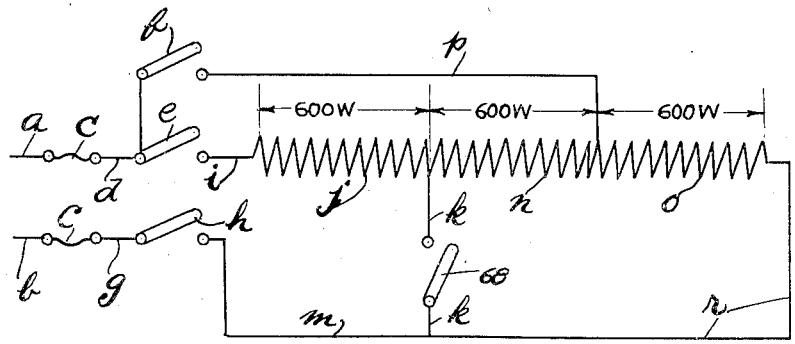
Inventor
Charles L. Goughnour,
By Bryant & Loring
Attorney Patented Oct. 17, 1933

1,931,190

UNITED STATES PATENT OFFICE 1,931,190

ELECTRIC HEATING ELEMENT FOR STEAM COOKERS

Charles L. Goughnour, Jefferson City, Tenn.

Application February 3, 1930. Serial No. 425,658

1 Claim. (Cl. 200—140)

This invention relates to certain new and useful improvements in electric heating elements for steam cookers and is a continuation in part of application filed by Charles L. Goughnour for Improvements in steam cookers, on May 26, 1927, Serial Number 194,372, Patent Number 1,756,787, dated April 29, 1930.

An important object of the invention is to utilize steam pressure confined within the cooker for automatically cutting off the heating medium, resistance control devices being associated with the cooker that are adapted to be initially set to cause the heating medium to be reduced in intensity when a predetermined temperature within the cooker has been attained, such devices being of a nature to permit their association with a heating medium of the electrical, gaseous or fluid type.

Another object of the invention is to provide a resistance heater element for the heater base of a steam cooker or other devices wherein more than two different degree temperatures may be attained from the resistance element, a plurality of control switches for the resistance being provided and having means associated therewith that is automatically operated by steam pressure for throwing the switches to open position and with means associated with each switch for selectively maintaining the same in closed position.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 its a side elevational view, partly in section of a steam cooker showing the heater base section thereof, showing a pipe line extending from the cooker chamber to a diaphragm chamber for showing the switch mechanism;

Figure 3 is a bottom plan view of the heater base of the steam cooker showing the automatically operating device for throwing the switches to open position;

Figure 4 is a fragmentary side elevational view of the heater base of the steam cooker, partly in section, showing the latches for the switch levers for holding them in closed position;

Figure 5 is a perspective view of the automatically operating lever for throwing the switches to open position;

Figure 6 is a perspective view of one of the switch levers;

Figure 7 is a diagrammatic view of one wiring arrangement embodying a three wire circuit affording three different degrees of heat;

Figure 8 is a diagrammatic view of the wiring arrangement disclosed in the aforementioned co-pending application and providing three different degrees of heat;

Figure 9 is a diagrammatic view of another wiring arrangement providing four different degrees of heat; and Figure 10 is a detail sectional view of the automatic switch throwing device shown in detail in the co-pending application.

Figure 1:
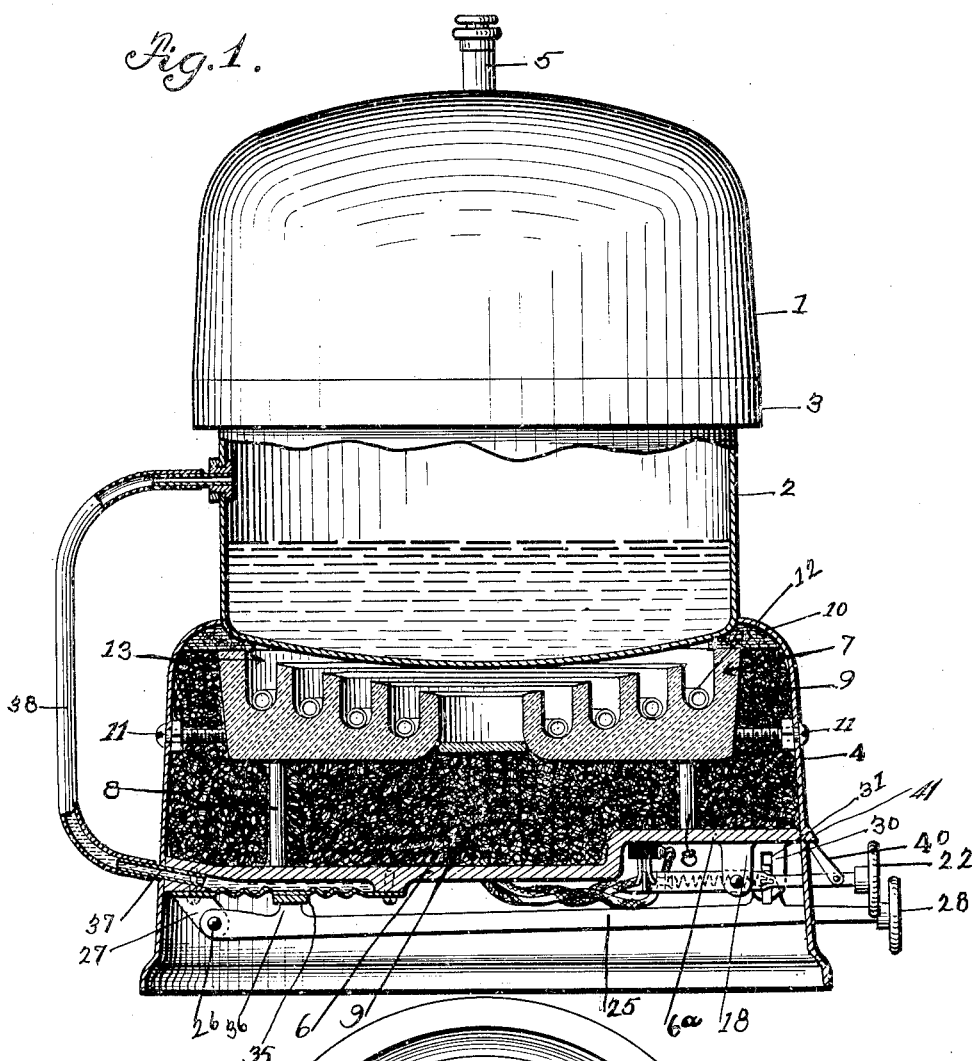

Referring more in detail to the accompanying drawings, there is illustrated an electric heating element for steam cookers wherein the cooker embodies upper and lower cooker sections 1 and 2 detachably engaged at meeting edges as at 3 to provide a steam tight joint, the lower cooker section 2 being removably mounted upon a heater base embodying an annular skirt or wall 4. The upper end of the upper cooker section 1 is provided with a safety valve 5.

Figure 2:
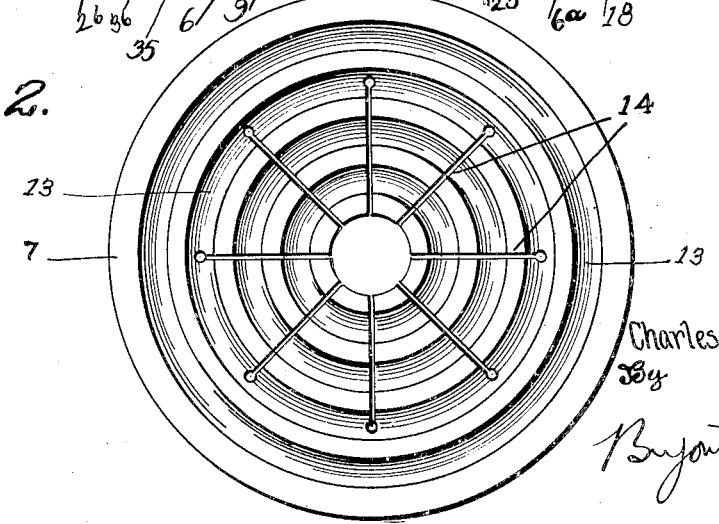
Figure 2 is a top plan view of the insulation block for supporting the heater resistance coils, the block being radially slotted providing for expansion and contraction.

The upper end of the annular wall 4 of the heater base is fashioned for the removable support of the lower cooker section 2, the heater base having a bottom wall 6 set therein at a point spaced upwardly from the lower edge with a porcelain disk 7 within the heater base disposed adjacent its upper end and supported upon vertical posts 8 with an insulation packing 9 beneath and surrounding the porcelain disk while the upper end of the heater base encloses a ring of asbestos 10 upon which the lower cooker section 2 is mounted as shown in Figure 1. The porcelain disk 7 is retained in position by the radial screws 11 passing through the side wall of the heater base and engaging the peripheral edge of the porcelain disk. The resistance element 12 is located in annular grooves 13 provided in the upper face of the disk 7 and as it is the intention to render lineal sections of the resistance element 12 operative, provision is made for expansion and contraction of the porcelain disk in the form of radial slots 14 as shown in Figure 2.

The switch mechanism for the resistance element 12 is shown more clearly in Figures 1 to 6 and the wiring diagram for this switch mechanism is shown in Figures 7 to 9, the switch mechanism embodying a pair of switches, each comprising a U-shaped lever having a short leg 15 and a long leg 16 pivotally mounted as at 17 upon spaced lugs 18 depending from an upset portion 6a of the bottom wall 6 with the closed end 19 thereof connected to a switch blade 20 and insulated therefrom as at 21. The longer leg 16 of each switch lever extends through a slotted opening in the side wall 4 of the heater base and has an operating handle 22 upon its outer end. A pair of switch contacts 23 is engaged by the switch blade 20 of one lever and a pair of contacts 24 is engaged by the switch blade of the other switch lever, the contacts 24 being secured to, insulated and depending from the upset portion 6a of the bottom wall 6.

A relatively long lever 25 extends across the bottom of the heater base, one end thereof being pivotally mounted as at 26 upon a lug 27 depending from one side edge of the bottom 6 while its other end extends through the opposite side wall 4 of the heater base with an operating handle 28 thereon. A pair of oppositely directed arms 29 are carried by the swinging end of the lever 25 within the heater base, the lever 25 being guided in its vertically swinging movement by extending through a pair of depending guide lugs 30 on the upset portion 6a of the bottom, said lugs 30 being slotted as at 31 for guiding the side arms 29. A coil spring 32 connects the outer end of each arm 29 to the closed end 19 of each switch lever, the joint of connection of the spring 32 with the ends of the arm 29 being in a plane above the opposite ends of the spring when the switch levers are closed for holding the lever 25 in its raised position.

It is intended to automatically open either one or both of the switch levers upon the presence of predetermined steam pressure within the cooker, this operation being accomplished by the provision of an expansion chamber associated with the bottom wall 6 of the heater base and in communication with the cooking chamber. As shown in Figures 1 and 3, the bottom wall 6 has a portion thereof forming one wall of the expansion chamber, the opposite wall of the chamber comprises the diaphragm 33 secured to the bottom wall as at 34 and disposed directly above the lever 25, the outer side of the diaphragm 33 carrying a centrally disposed button 35 engageable with the lug 36 upon the lever. A pipe fitting 37 extends from one side of the expansion chamber to the side wall 4 of the heater base and has a tubular connection 38 with a nipple carried by the lower cooker section 2 as shown in Figure 1. The expansion chamber and tubular connector 38 is normally filled with water and steam pressure in the steam cooker acting upon the water in the expansion chamber causes a downward flexing of the diaphragm 33 and a downward pivotal movement of the lever 25. When the lever 25 swings downwardly at its outer end, the cross arm 29 carried thereby lowers the corresponding ends of the springs 32 and upon moving below the center of the switch lever pivots 17, the spring 32 acts upon the closed ends 19 of the switches carrying the blades 20 to swing the blades downwardly out of engagement with the contacts 23 and 24. Should it be desired to retain one of the switch levers in its closed position against action of its associated spring 32 upon lowering movement of the lever 25, the strap arm 40 shown in Figures 1 and 4 that is pivotally connected to the outwardly extending end of each lever leg 16 is moved into engagement with a keeper lug 41 on the side wall 4 of the heater base above the switch legs.

The form of operating lever and associated diaphragm disclosed in Figure 10 is a division of the aforementioned co-pending application, this form of the invention disclosing a switch rod 42 having a switch arm 43 engageable with a contact 44 with an extension 45 on the end of the switch rod 42 engageable with the diaphragm 46 of an expansion chamber that is carried by a fitting 47 mounted in the side wall 4a of the heater base. The fitting 47 has a nipple 48 threaded into the outer end thereof and is provided with a cavity 49 and an outlet 50 at its upper side to atmosphere. A ball valve 51 is confined in the cavity 49. A tubular connection is established between the nipple 48 and steam chamber of the cooker, the steam initially escaping the atmosphere through the vent opening 50 and condensing in the cavity 49 causing a rise of the ball valve 51 to close the vent 50 with the steam pressure thereafter acting against the diaphragm 46 for shifting the switch rod 42 to separate the switch arm 43 and contact 44.

The resistance element and circuit for the layout in Figure 3 is shown in Figure 7 and is of three feeder line character, the lead-in wire 55 having a fuse 56 set therein with a wire connection 57 with the switch 23a and continuing therefrom as at 58 to one end of a resistance element divided into sections 59, 60 and 61 of equal wattage, the wire 58 being connected to one end of the resistance section 59. The second lead-in wire 62 has a fuse 63 set therein and continues at 64 to the switch element 24a and continues therefrom as at 65 for attachment to the resistance element between the resistance sections 60 and 61. The outer end of the resistance section 61 has an outlet wire 66 leading to the neutral wire and ground 67. With this three wire arrangement, it is possible to procure three different degrees of heat and while the diagrammatic showing in Figure 7 discloses each lineal section of the resistance element as embodying six hundred watts, it is to be understood that other degrees of heat and other ratios thereof may be embodied in each section of the resistance element. When the switch 23a is closed and switch 24a opened, the resistance is of two hundred wattage, current flowing the entire length of the resistance sections 59, 60 and 61 and returning through the line 66 to the neutral wire and ground. When switch 24a is closed and switch 23a opened, the current flows through line 65 to one end of the resistance section 61 and out of the other end thereof through the line 66 to ground 67 representing six hundred wattage as the entire voltage of 110 flows through the single resistance element. When both switches 23a and 24a are closed, the full wattage of eighteen hundred is present in the resistance element.

The wiring diagram shown in Figure 8 is a two wire or feeder, the same as disclosed in the aforementioned application and is used in connection with the form of the invention shown in Figure 10, there being a pair of lead in wires $a$ and $b$ having fuse inserts $c$, the wire $d$ from wire $a$ leading to manual switches $e$ and $f$, while the wire $g$ from the wire $b$ leads to an automatic switch $h$. The switch $e$ has a wire connection $i$ with the section of resistance $j$ that is set into the spiral groove of the concaved disk 35, the wire $k$ from the section of resistance $j$ leading to the automatic switch $h$ by the wire $m$. The resistance section $j$ is in series with the two resistance sections $n$ and $o$ while the wire $p$ from the switch $f$ leads to the resistance sections $n$ and $o$. The wire $r$ from the resistance section $o$ returns to the wire $m$ and automatic switch $h$. Each of the resistance sections $j$, $n$ and $o$ carries a capacity of 600 watts and with this arrangement of switches it is possible to employ a capacity of either 600, 1200, or 1800 watts. When using 600 watts, the switch $f$ is opened and the switch $e$ is closed, the current flowing through the resistance $j$ and returning to the lead in wire $b$ by way of the wires $k$, $m$, automatic switch $h$ and wire $g$. When it is desired to employ a resistance capacity of 1200 watts, the switch $e$ is manually opened and the switch $f$ closed, the current flowing from the switch $f$ through the wire $p$ to resistance sections $n$ and $o$ and returning over wires $k$ and $r$ to wire $m$, automatic switch $h$ and wire $g$. When employing the full resistance capacity of 1800 watts, both manual switches $e$ and $f$ are closed.

The wiring arrangement shown in Figure 9 is a two wire or feeder similar to the arrangement shown in Fig. 8 and in addition thereto provides an additional switch 68 in the wire $k$ whereby four separate degrees of heat are obtained. With switches $e$ and $h$ closed, the wattage is two hundred, with switches $e$, $h$ and 68 closed, the wattage is six hundred, with switches $f$, $h$ and 68 closed the wattage is twelve hundred and with all switches closed, the wattage is eighteen hundred.

From the above detailed description of the invention, it is believed that the construction and operation thereof will at once be apparent, it being noted that excessive steam pressure in the cooker operates to throw the switch levers for cutting out the source of energy and with the provision of the arms 40 upon the switch levers that cooperate with the heater base, it is possible to start a cooking operation with full heating resistance employed and to automatically reduce the resistance whereby cooking may continue at a simmering degree of temperature, or to entirely cut off the heat automatically. With reference to the switch levers, it is noted that they are retained in closed position by their spring connections 32 with the lever 25 and when the lever is lowered by the diaphragm 33 of the steam expansion chamber, the cross arms 29 on the lever pull downwardly on the springs and closed ends of the switch levers to separate the blades 20 from the contacts 23 and 24. Should it be desired to retain one or both of the switch levers in closed position, the arm 40 carried thereby is moved into engagement with the keeper lug 41 so that upon lowering movement of the lever 25, the spring will be placed under tension but will fail to operate the switch lever.

While there are herein shown and described the preferred embodiments of the invention, it is nevertheless to be understood that minor changes may be made therein without departing from the spirit and scope of the invention as claimed.

I claim:—

In a switch for controlling the flow of heating energy to a cooker, pivotally mounted switch arms and contacts, a lever pivotally mounted to move between the switch arms, laterally directed arms on the lever and spring connections between the outer ends of the last named arms and switch arms for normally holding the switch arms engaged with the contacts, and operating to separate the switch arms from the contacts when the lever is operated.

CHARLES L. GOUGHNOUR.